US005222651A

United States Patent [19]

Pilsinger et al.

[11] Patent Number: 5,222,651

[45] Date of Patent: Jun. 29, 1993

[54] PROCESS FOR PRODUCING A VACUUM INTERRUPTER CHAMBER

[75] Inventors: Günter Pilsinger, Düsseldorf, Fed. Rep. of Germany; Joseph Lipperts, Venlo, Netherlands; Wolfgang Diem, Bruchköbel, Fed. Rep. of Germany

[73] Assignees: Calor-Emag Elektrizitaets-Aktiengesellschaft, Ratingen; Degussa AG, Frankfurt, both of Fed. Rep. of Germany

[21] Appl. No.: 586,695

[22] Filed: Sep. 24, 1990

[30] Foreign Application Priority Data

Sep. 23, 1989 [DE] Fed. Rep. of Germany ....... 3931774

[51] Int. Cl.[5] .............................................. B23K 15/06

[52] U.S. Cl. .................................... 228/122; 228/221; 228/249

[58] Field of Search ...................... 228/56.3, 221, 249, 228/122; 445/43

[56] References Cited

U.S. PATENT DOCUMENTS

| | | | |
|---|---|---|---|
| Re. 27,733 | 8/1973 | Bereza | 228/221 X |
| 2,882,116 | 4/1959 | Williams | 445/43 |
| 3,368,023 | 2/1968 | Dimock, Jr. | 228/122 X |
| 4,037,027 | 7/1977 | Desplanches et al. | 228/122 X |
| 4,433,230 | 2/1984 | Sano et al. | 219/118 |

FOREIGN PATENT DOCUMENTS

| | | | |
|---|---|---|---|
| 1104623 | 4/1961 | Fed. Rep. of Germany . | |
| 2612129 | 10/1976 | Fed. Rep. of Germany . | |
| 8810941 | 11/1988 | Fed. Rep. of Germany . | |
| 57-90846 | 6/1982 | Japan | 228/221 |

OTHER PUBLICATIONS

*Welding Handbook*, 7th ed., vol. 3, American Welding Society, (1980), ch. 6, esp. pp. 218, 226–228.

*Primary Examiner*—Richard K. Seidel

*Attorney, Agent, or Firm*—Herbert L. Lerner; Laurence A. Greenberg

[57] ABSTRACT

A process for producing a vacuum interrupter chamber includes placing spacers in bodily contact with a soldering foil and joining the spacers to the soldering foil or fixing them in a displacement-proof fashion on specially made dents in the foil, so that they can be fixed for the purpose of a reliable and simple assembly. Degassing gaps are left between soldering spacers, on which a cover of the interrupter chamber rests. The vacuum interrupter chamber is evacuated in a single furnace cycle and soldered.

9 Claims, 4 Drawing Sheets

PROCESS FOR PRODUCING A VACUUM INTERRUPTER CHAMBER

The invention relates to a process for producing a vacuum interrupter or switch chamber, which includes individually distributing soldering spacers about the circumference of a soldering foil, bringing the soldering spacers into bodily contact with the soldering foil, introducing the soldering foil and the soldering spacers into a soldering gap formed between a metallic cover and the end of a ceramic housing of the interrupter chamber with the cover resting on the soldering spacers and producing degassing gaps being between the soldering spacers, and evacuating and sealing the vacuum interrupter by soldering in a single furnace cycle.

When constructing interrupter chambers, which are produced by using the direct solder-sealing technique, i.e. by evacuating and sealing the chamber by soldering in a furnace cycle, it is necessary to leave an evacuation or degassing gap leading to the interior of the chamber, which is not sealed by melting the solder until a satisfactory high vacuum has been achieved. Degassing gaps can be formed by the soldering foil itself by constructing it with corrugations or pressing it to form knobs, as disclosed in German Published, Prosecuted Application DE-AS 11 04 623.

However, such measures are only successful in the case of relatively light soldering assemblies. In the case of heavy assemblies, there is the danger of the stability of the foil being reduced because of the softening of the solder at higher temperatures, and the degassing or evacuation gap becoming prematurely sealed before the soldering process is concluded.

A procedure has therefore been adopted wherein individual, heavy soldering spacers are placed on a flat soldering foil, while distributing them about the circumference. The spacers are formed of either of L, V or O-shaped solder wire sections, or of heavy, stamped, rectangular, square or round solder sections. According to German Published, Non-Prosecuted Application DE-OS 20 44 277, the spacers are formed of U-shaped pockets, which are pushed onto the soldering foil. Such spacers must be placed on the soldering foil exactly, and manually as a rule, without having marker points on the soldering foil. In the process, there is a danger of the spacers shifting as the assembly continues, and in the worst case falling into the vacuum chamber, from which they must once again be removed with a large time outlay. Furthermore, the solder wire pieces can become unnecessarily contaminated during production, and that can result in a solder joint that is not vacuum-tight.

It is accordingly an object of the invention to provide a process for producing a vacuum interrupter chamber, which overcomes the hereinafore-mentioned disadvantages of the heretofore-known methods of this general type and with which the soldering spacers can be positioned exactly and in such a way as to be secure during assembly.

With the foregoing and other objects in view there is provided, in accordance with the invention, a process for producing a vacuum interrupter chamber, which comprises individually distributing soldering spacers about the circumference of a soldering foil defining degassing gaps between the soldering spacers, fixing the soldering spacers in displacement-proof contact with the soldering foil, introducing the soldering spacers and the soldering foil into a soldering gap between a metallic cover resting on the soldering spacers and the end of a ceramic housing, and evacuating and sealing the vacuum interrupter chamber by soldering in a single furnace cycle.

In accordance with another mode of the invention, there is provided a process which comprises attaching the soldering spacers to the soldering foil.

It seems to be difficult for the soldering parts (the foil and the spacers) to be attached to one another in an oxide-free fashion. With the materials that are to be joined, which as a rule are formed of silver, gold, copper or mixtures thereof, welding processes are not possible or are only possible at very great expense. In contrast, attaching by means of laser welding has proved to be a simple and successful joining process.

Therefore, in accordance with a further mode of the invention, there is provided a process which comprises carrying out the attachment step with a laser pulse.

In accordance with an added mode of the invention, there is provided a process which comprises laser welding with the laser pulse in an atmosphere selected from the group consisting of a vacuum and an inert-gas.

The two materials are heated at their interfaces by a brief, high-energy laser pulse to such an extent that they are welded to one another in an oxide-free fashion.

A further possibility for displacement-proof fixing deals with providing the soldering foil with dents, in, around or on which appropriately constructed soldering spacers are placed.

Therefore, in accordance with an additional mode of the invention, there is provided a process which comprises forming permanent dents in the soldering foil, and fixing the soldering spacers to the dents.

In accordance with yet another mode of the invention, there is provided a process which comprises forming trough-shaped sections with the dents in the soldering foil, matching the soldering spacers to the trough-shaped sections, and inserting the soldering spacers in the trough-shaped sections.

In accordance with yet a further mode of the invention, there is provided a process which comprises forming the dents as boss-shaped dents, and placing one of the soldering spacers in the form of a solder wire ring around each respective boss-shaped dent.

In accordance with yet an added mode of the invention, there is provided a process which comprises forming hump-shaped dents in the form of pockets with hump-shaped troughs in the soldering foil, and inserting one of the soldering spacers in the form of a solder wire section in each respective hump-shaped trough.

In accordance with yet an additional mode of the invention, there is provided a process which comprises forming at least one recess in one of the soldering spacers, and placing one of the dents into the at least one recess.

Finally, caulking the parts to be joined has proved to be a reliable method of attachment. In this process, a foil section is pressed into the soldering spacer, preferably with a tool.

Therefore, in accordance with again another mode of the invention, there is provided a process which comprises caulking the soldering foil and the soldering spacers to each another.

In accordance with a concomitant mode of the invention, there is provided a process which comprises caulking the soldering foil to circular discs forming the soldering spacers.

Other features which are considered as characteristic for the invention are set forth in the appended claims.

Although the invention is illustrated and described herein as embodied in a process for producing a vacuum interrupter chamber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIGS. 4*a* to 7*a* are fragmentary, sectional views taken along the section lines in FIGS. 4 to 7, respectively, in the direction of the arrows.

Figure 1:
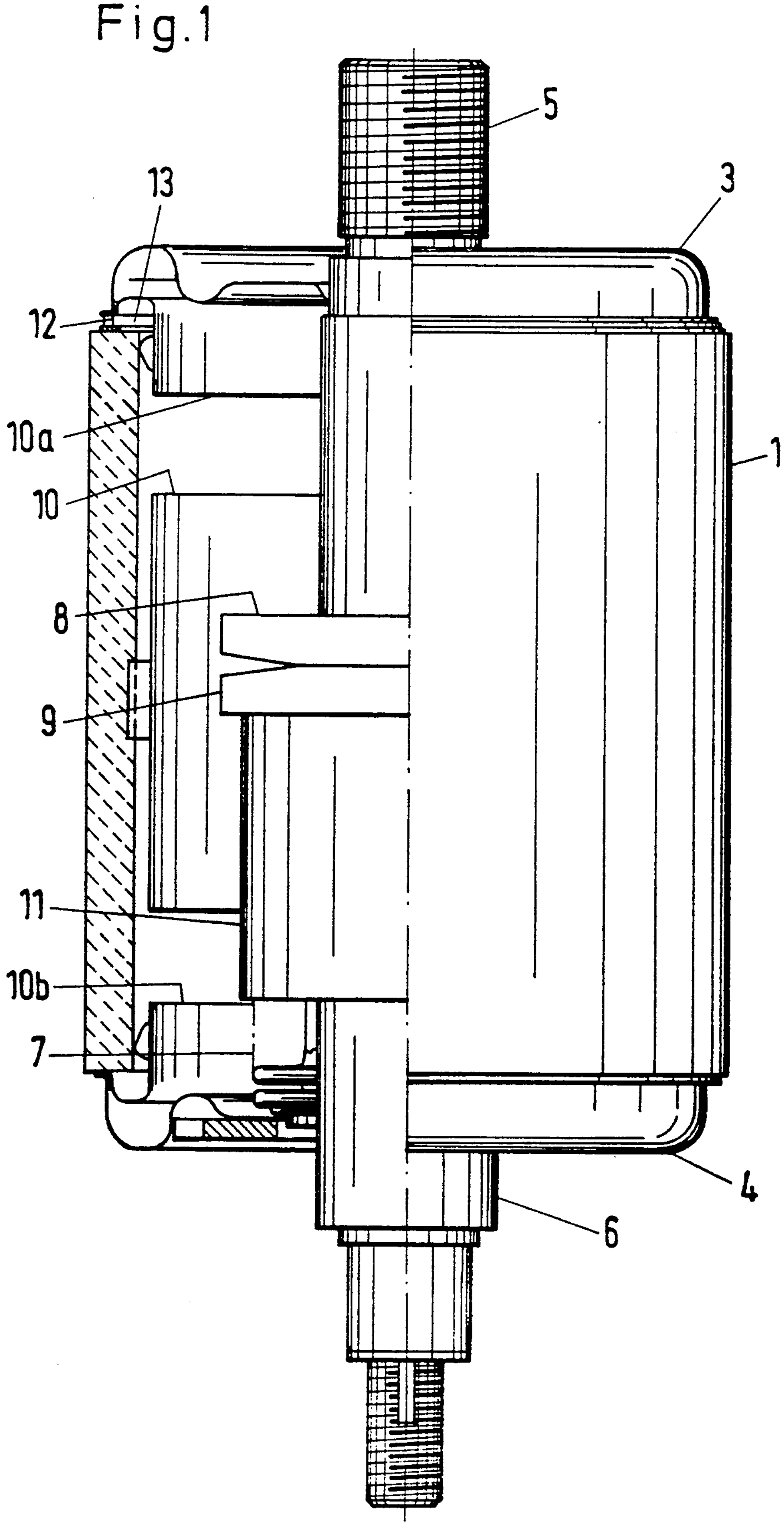
FIG. 1 is a diagrammatic half-sectional view of a vacuum interrupter chamber.

Referring now to the figures of the drawings in detail and first, particularly, to FIG. 1 thereof, there is seen a vacuum interrupter chamber containing a cylindrical ceramic housing 1, which is sealed by two metallic covers 3, 4. The covers are penetrated in a vacuum-tight fashion by two conductor stems 5, 6. The stem 6 is movable and joined to the cover 4 by a bellows 7. The stems 5, 6 carry switching contact pieces 8, 9, and are surrounded by a metal screen 10, which protects the ceramic housing 1 against switching arc products. Further metal screens 10*a*, 10*b* serve to provide internal voltage endurance of the interrupter chamber, and cover the inner end edge of the ceramic housing 1. A metal sheath 11 protects the bellows 7.

Figure 2:
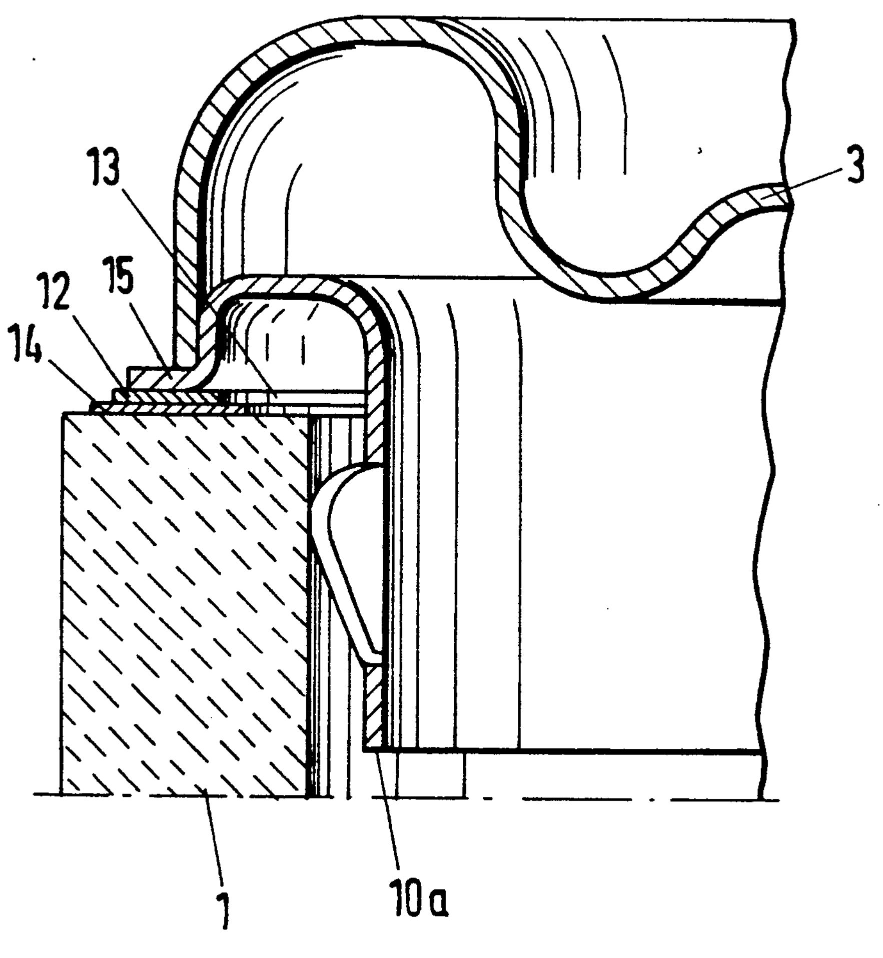
FIG. 2 is a fragmentary, enlarged, partly sectional view of the region of the cover and ceramic housing of a vacuum interrupter chamber.

So-called soldering assemblies are set up in order to produce the interrupter chambers, i.e. different chamber parts are assembled with the interposition of solder, e.g. in the form of soldering foils. Finally, the soldering assemblies are united to form an interrupter chamber seen in FIG. 1, and are placed into a vacuum furnace. The vacuum furnace is evacuated, and heated up to the melting temperature of the solders. Degassing gaps are to be provided so that the gasses can escape from the chamber. For this purpose, the metallic cover 3 is put in place with the aid of soldering spacers 12. A degassing gap 13 forms between the individual soldering spacers 12 that are distributed about the circumference. In the example shown in FIG. 2, the spacers 12 are placed on a soldering foil 14, which has the shape of a circular ring and ensures the basic supply of solder for the joint. The cover 3 is not directly soldered onto the ceramic housing 1, but rather with the interposition of an annular rim 15 of the soft-metal screen 10*a*, which compensates for the different expansion coefficients of the previously named parts to be joined. In the process to be considered in this case, the cover 3 and the metal screen 10*a* form a unit, and are put in place by the soldering spacers 12.

As soon as the desired vacuum is achieved in the soldering furnace and thus in the interior of the interrupter chamber, the soldering furnace temperature is raised to the melting temperature of the soldering spacers 12, the soldering spacers 12 flow together, and the cover 3 drops down thus eliminating the degassing gaps. After hardening of the solder, the interrupter chamber is sealed in a vacuum-tight fashion.

Figure 3:
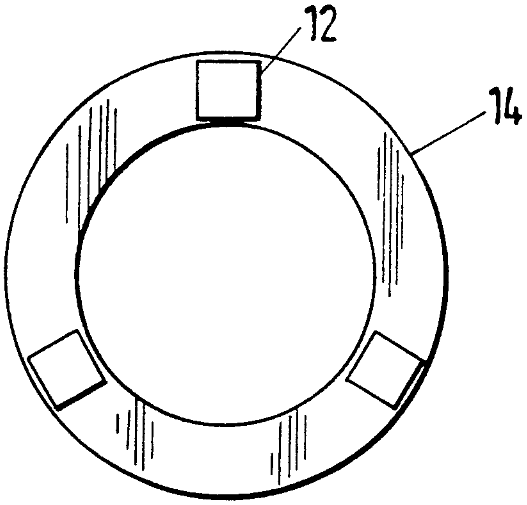
FIG. 3 is a top-plan view of a soldering foil.

FIG. 3 shows a top view of the soldering foil 14 with the soldering spacers 12 placed thereon. The two parts are firmly joined and can be manipulated as a whole. According to the invention, the joining is carried out by means of a laser pulse, which penetrates the respective parts and welds in a punctiform fashion. It is advisable for the joining process to be undertaken in a vacuum or an inert-gas atmosphere.

Figure 4:
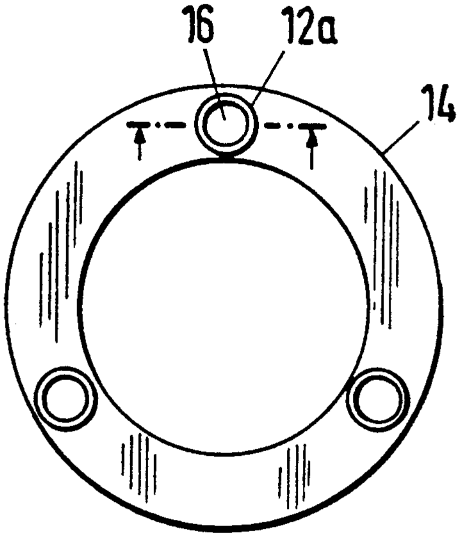
FIGS. 4 to 7 are top-plan views showing variations of the fixing between the soldering foil and soldering spacers.
Figure 4A:
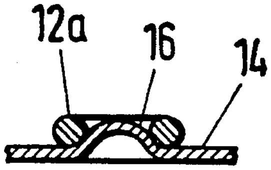

FIGS. 4 and 4*a* show a variant of the invention, in accordance with which each soldering spacer is constructed as a solder wire ring 12*a*, which is placed in each case around a boss-shaped dent 16 embossed in the soldering foil 14. Consequently, for the purpose of assembly, the soldering spacer is located in a relatively displacement-proof fashion. Three such fixing points which are distributed about the circumference of the soldering foil, are sufficient in each case.

Figure 5:
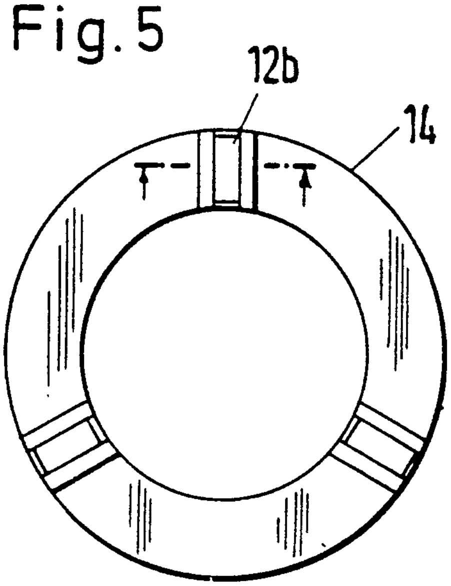
Figure 5A:
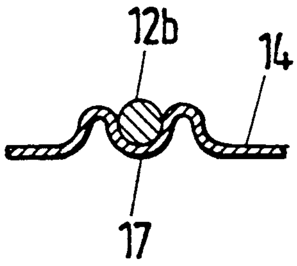

In the case of the variants according to FIGS. 5 and 5*a*, the soldering foil 14 is formed with hump-shaped pockets 17 having hump troughs, in which soldering spacers in the form of solder wire sections 12*b* are inserted.

Figure 6:
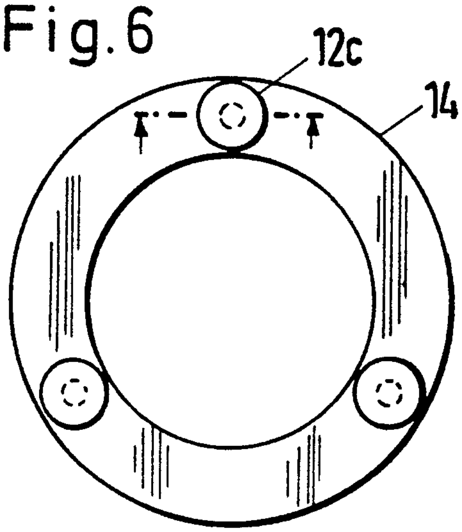
Figure 6A:
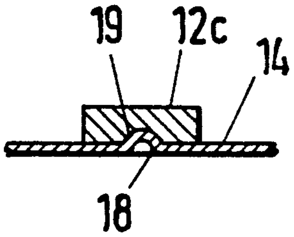

As may be seen in FIGS. 6 and 6*a*, a dent 18 in the soldering foil 14 fits into a corresponding recess 19 in a soldering spacer, which is constructed as a circular disc 12*c*.

Figure 7:
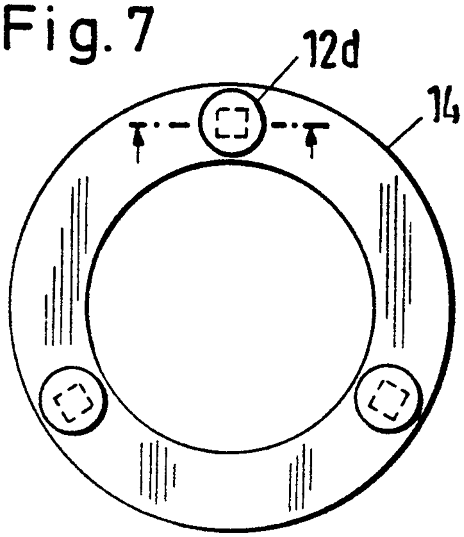
Figure 7A:
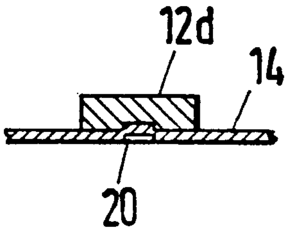

In accordance with FIGS. 7 and 7*a*, the soldering foil 14 and a soldering spacer 12*d* are joined to one another by caulking. In this process, a soldering foil section 20 is pressed into the soldering spacer 12*d* with a tool, but only so far as to ensure that the soldering foil section 20 is not completely severed from the soldering foil 14.

Due to the ways of preventing displacement of the soldering spacers which have been shown, the production of the vacuum interrupter chamber is substantially facilitated and rendered more reliable.

We claim:

1. Process for producing a vacuum interrupter chamber, which comprises individually distributing soldering spacers about the circumference of a soldering foil defining degassing gaps between the soldering spacers, attaching the soldering spacers to the soldering foil with a laser pulse, introducing the soldering spacers and the soldering foil into a soldering gap between a metallic cover resting on the soldering spacers and the end of a ceramic housing, and evacuating and sealing the vacuum interrupter chamber by soldering in a single furnace cycle.

2. Process according to claim 1, which comprises laser welding with the laser pulse in an atmosphere selected from the group consisting of a vacuum and an inert-gas.

3. Process for producing a vacuum interrupter chamber, which comprises individually distributing soldering spacers about the circumference of a soldering foil defining degassing gaps between the soldering spacers, forming permanent dents in the soldering foil, fixing the soldering spacers to the dents, introducing the soldering spacers and the soldering foil into a soldering gap between a metallic cover resting on the soldering spaces and the end of a ceramic housing, ad evacuating and sealing the vacuum interrupter chamber by soldering in a single furnace cycle.

4. Process according to claim 3, which comprises forming trough-shaped sections with the dents in the soldering foil, matching the soldering spacers to the trough-shaped sections, and inserting the soldering spacers in the trough-shaped sections.

5. Process according to claim 3, which comprises forming the dents as boss-shaped dents, and placing one of the soldering spacers in the form of a solder wire ring around each respective boss-shaped dent.

6. Process according to claim 3, which comprises forming hump-shaped dents in the form of pockets with hump-shaped troughs in the soldering foil, and inserting one of the soldering spacers in the form of a solder wire section in each respective hump-shaped trough.

7. Process according to claim 3, which comprises forming at least one recess in one of the soldering spacers, and placing one of the dents into the at least one recess.

8. Process according to claim 3, which comprises caulking the soldering foil and the soldering spacers to each another.

9. Process according to claims 7, which comprises caulking the soldering foil to circular discs forming the soldering spacers.

* * * * *